United States Patent [19]
Jones

[11] Patent Number: 6,017,648
[45] Date of Patent: Jan. 25, 2000

[54] INSERTABLE FLUID FLOW PASSAGE BRIDGEPIECE AND METHOD

[75] Inventor: Daniel O. Jones, Glenville, Nev.

[73] Assignee: Plug Power, L.L.C., Latham, N.Y.

[21] Appl. No.: 08/839,667

[22] Filed: Apr. 15, 1997

[51] Int. Cl.⁷ .................................................. H01M 8/02
[52] U.S. Cl. .................................................. 429/35; 429/39
[58] Field of Search ................... 429/35, 38, 39

[56] References Cited

U.S. PATENT DOCUMENTS

| | | | |
|---|---|---|---|
| 4,403,018 | 9/1983 | Alfenaar et al. | 429/39 X |
| 4,590,135 | 5/1986 | Warszawski et al. | 429/38 |
| 4,743,518 | 5/1988 | Romanowski | 429/39 X |
| 4,818,640 | 4/1989 | Fukuda et al. | 429/39 X |
| 4,945,019 | 7/1990 | Bowen et al. | 429/39 X |
| 5,200,278 | 4/1993 | Watkins et al. | 429/24 |
| 5,234,776 | 8/1993 | Koseki | 429/30 |
| 5,342,706 | 8/1994 | Marianowski et al. | 429/35 |
| 5,514,487 | 5/1996 | Washington et al. | 429/39 |

FOREIGN PATENT DOCUMENTS

| | | |
|---|---|---|
| 0 281 949 | 9/1988 | European Pat. Off. . |
| 62-147665 | 7/1987 | Japan . |
| 63-105474 | 5/1988 | Japan . |
| 1-173576 | 7/1989 | Japan . |
| 6-089728 | 3/1994 | Japan . |
| 9-035726 | 2/1997 | Japan . |
| WO 96 20510 | 7/1996 | WIPO . |

*Primary Examiner*—Stephen Kalafut
*Attorney, Agent, or Firm*—Heslin & Rothenberg, P.C.

[57] ABSTRACT

A fluid flow passage bridgepiece for insertion into an open-face fluid flow channel of a fluid flow plate is provided. The bridgepiece provides a sealed passage from a columnar fluid flow manifold to the flow channel, thereby preventing undesirable leakage into and out of the columnar fluid flow manifold. When deployed in the various fluid flow plates that are used in a Proton Exchange Membrane (PEM) fuel cell, bridgepieces of this invention prevent mixing of reactant gases, leakage of coolant or humidification water, and occlusion of the fluid flow channel by gasket material. The invention also provides a fluid flow plate assembly including an insertable bridgepiece, a fluid flow plate adapted for use with an insertable bridgepiece, and a method of manufacturing a fluid flow plate with an insertable fluid flow passage bridgepiece.

19 Claims, 9 Drawing Sheets

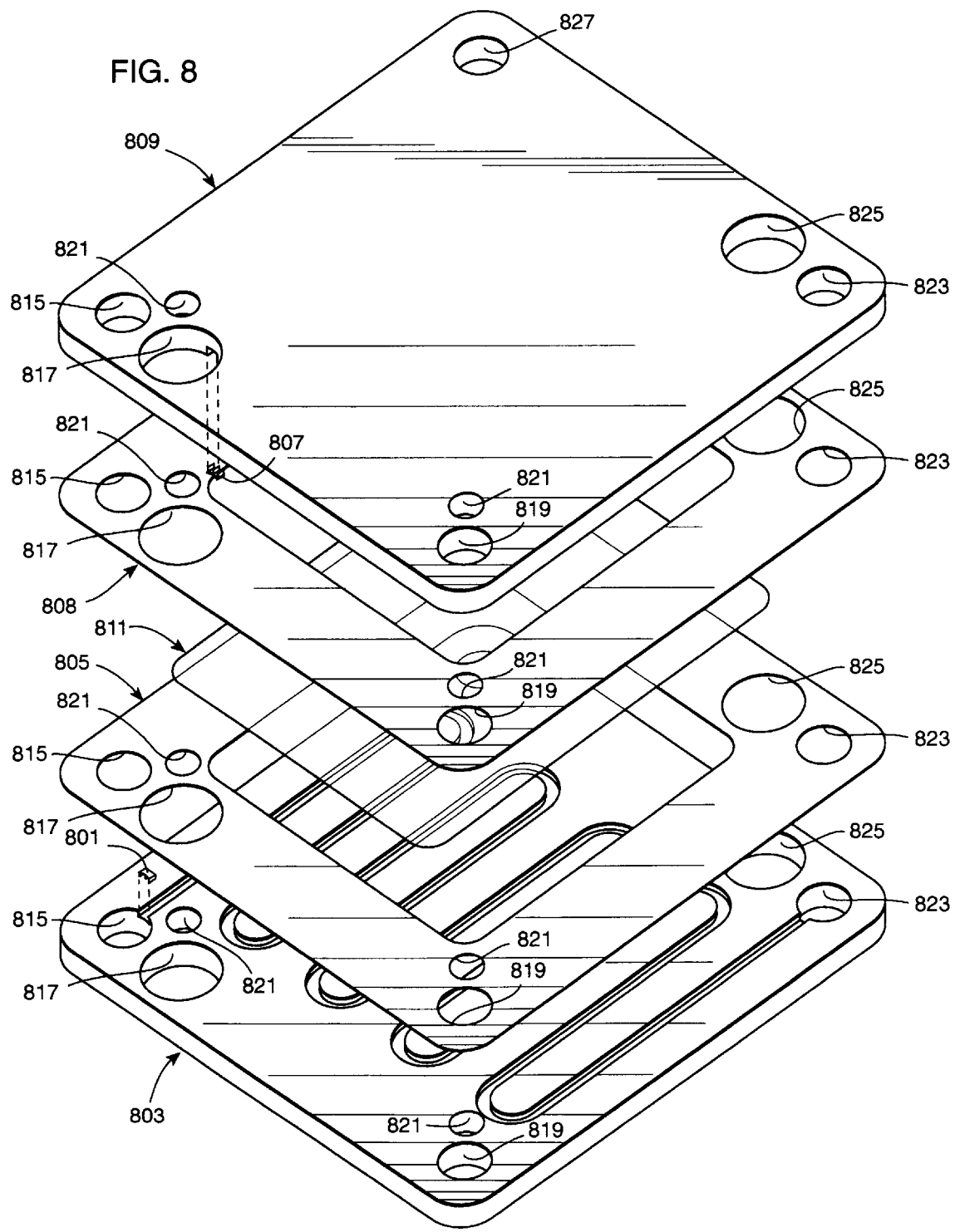

INSERTABLE FLUID FLOW PASSAGE BRIDGEPIECE AND METHOD

This invention was made with Government support under Contract No. DE-AC02-94CE0389awarded by The Department of Energy. The Government has certain rights in this invention.

BACKGROUND OF THE INVENTION

This invention relates to fuel cells formed by aligning fluid flow plates and other components to form a fuel cell assembly stack. In particular, this invention provides an improved means of introducing fluid from a fluid manifold into channels in a fluid flow plate. While this invention can be applied to various apparatuses involving stacked fluid flow plates, it is particularly pertinent to fuel cells using Proton Exchange Membrane technology.

DESCRIPTION OF THE RELEVANT ART

A Proton Exchange Membrane (PEM) fuel cell converts the chemical energy of a fuel, such as hydrogen, directly into electrical energy. PEM fuel cells offer many advantages over conventional means of generating electrical energy: they operate at relatively low temperatures and therefore require little or no warmup time; they are clean (their exhaust is typically water and air), they are efficient, and the typical source of fuel—hydrogen—is in abundant supply. Nevertheless, due to difficulties and costs in manufacturing, PEM fuel cells have not yet achieved their potential as replacements for conventional means of generating electrical energy. The instant invention addresses one of the manufacturing problems that has plagued fuel cell technology.

The centerpiece of a typical PEM-type fuel cell is a solid polymer electrolyte—the PEM—that permits the passage of protons from the anode side of the cell to the cathode side, while preventing the passage of gases that provide the chemical fuel for the cells. FIG. 1 depicts a typical PEM-type fuel cell. A reaction on the anode side of the PEM produces protons (H$^+$) and electrons. The protons pass through the membrane to the cathode side, and the electrons also travel to the cathode side of the membrane, but through an external electrical conductor. On the cathode side, the protons and electrons react with oxygen gas to produce water. The external electron flow from the anode to the cathode is the electrical energy created by the fuel cell reaction that can be used to supply electricity to a load.

More specifically, as depicted in FIG. 1, the PEM fuel cell 100 comprises an anode-side fluid flow plate 102 for the flow of hydrogen, an anode area 104, a proton exchange membrane 106, a cathode area 108, and a cathode-side fluid flow plate 110 for the flow of oxygen or air containing oxygen. Hydrogen gas introduced from a hydrogen manifold 112 at the anode-side fluid flow plate 102 travels along a fluid flow channel 124 in the anode-side flow plate 102, and also diffuses in a direction perpendicular to the flow channel toward the anode area 104. In the anode area 104, the hydrogen gas is oxidized to form hydrogen nuclei (H$^+$ ions or protons) and electrons. The H$^+$ ions travel through the proton exchange membrane 106 to the cathode area 108, but the hydrogen gas itself does not penetrate the proton exchange membrane 106.

The electrons formed by the above-mentioned reaction are conducted from the anode area 104 to the anode-side fluid flow plate 102, to copper collector plates 114. Electrons flow from the copper collector plates 114 through an external electrical conductor 116 to a load 118, and from the load to the cathode side of the fuel cell.

At the cathode side, oxygen gas, either in pure form or as a component of air, is introduced to a channel 120 on a cathode-side fluid flow plate 110 from an oxygen manifold 122. The oxygen reacts with the protons (H$^+$) coming through the membrane 106 as described above and the electrons coming from the external conductor as also described above, to form water.

In the PEM cell, the two chemical reactions are:

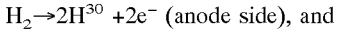
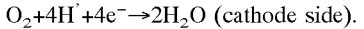

$H_2 \rightarrow 2H^{3O} + 2e^-$ (anode side), and $O_2 + 4H^+ + 4e^- \rightarrow 2H_2O$ (cathode side).

Each fuel cell typically delivers a relatively small voltage, on the order of about 0.4 to about 0.9 volts. In order to achieve higher voltage, fuel cells are typically connected in series, as a fuel cell stack.

Some fuel cell stack designs employ "cooler" plates or "humidifier plates" that are positioned in the stack in order to provide needed cooling of the assembly, humidification of reactant gases, or both. A fuel cell stack therefore typically requires means for distributing hydrogen, oxygen, coolant means and humidification means to the different flow plates in the fuel cell stack. Usually the coolant means and humidification means is water.

Typically, the distribution of hydrogen, oxygen, and water to the various fluid flow plates in the fuel cell stack, as well as removal of unused reactant gases and water from the plates, is accomplished by means of fluid flow manifolds. Each of the various components in the stack has "manifold holes" which, when aligned, form columns that are used as the fluid flow manifolds. Thus, the manifold conducts fluid perpendicularly to the planes of the various fluid flow plates. If a particular plate distributes the fluid that is being conducted through a particular fluid manifold, that manifold must be in communication with that plate's means for distributing that fluid (usually, a flow channel).

The present invention addresses how most effectively to conduct fluid from such a columnar fluid flow manifold to an open-face flow channel on a fluid flow plate.

The prior art has thus far focused on obvious solutions to the problem. Typically, the open-face flow channel is not directly connected to the manifold hole on the fluid flow plate. Rather, a passage drilled from the inside of the manifold hole to the inside of the beginning of the fluid flow channel serves to connect the manifold to the flow channel. The required passage is drilled either by "edge drilling" or "angle drilling." Neither of these methods is wholly satisfactory.

FIGS. 2 and 2A depict the prior art method of edgedrilling a fluid passage to connect an inlet manifold to a flow channel in a fluid flow plate. As can be seen from FIG. 2, edge drilling involves drilling two passages within the plane of the fluid flow plate. The first passage penetrates the outer edge of the fluid flow plate 201 to connect to the inlet manifold hole 203; this permits the drill to continue drilling on the other side of the inlet manifold hole 203 to connect the inlet manifold hole to the fluid flow channel 205 on the fluid flow plate. As can readily be seen, the need for precision in such drilling is paramount, and can be expensive. In addition, the diameter of the drilled passage is limited according to whether an increased diameter of the passage would affect the structural integrity of the fluid flow plate. By the same token, the minimum thickness of the fluid flow plate is determined by the minimum required size of the passage for fluid flow. Finally, with edge drilling, the first-made passage must be plugged after the drilling is completed, as depicted in FIG. 2A. This involves an extra manufacturing step, and the potential for leaks, corrosion, and contamination at the site of this plug is increased.

FIGS. 3 and 3A depict the prior art method for angle-drilling a fluid passage 301 connecting the inlet manifold to the flow channel in a fluid flow plate. As can be seen from the drawings, the passage 301 must be drilled at an angle to the plane of the fluid flow plate. As can readily be seen, the need for precision in such drilling is paramount, and can be expensive. Like the edge-drilled passage, the diameter of the angle-drilled passage 301 is limited according to whether an increased diameter of the passage would affect the structural integrity of the fluid flow plate. The minimum thickness of the fluid flow plate is even more restricted than is the case with an edge-drilled passage because of the angular direction of the passage into the plane of the fluid flow plate.

While it is conceivable that a specialized drill could be constructed to permit edge drilling from the inside of the manifold hole, and thereby avoid the problem associated with the extra hole, even such an innovation would not solve the problem of the fact that drilling the passage sets a lower limit on the thickness of the plate. This is particularly significant in view of new lighter and thinner plate materials now being used in order to make PEM fuel cells practical in automotive applications.

The problem of drilling holes is even more acute in the case where the fluid flow plate contains more than one flow channel. In this case, drilling becomes even more difficult, as more holes need to be drilled. This places even further limitations on the construction of the plate, including, for example, on the location of the inlets to the multiple flow channels on the fluid flow plate.

SUMMARY OF THE INVENTION

An object of the invention is to provide a fuel cell fluid flow plate assembly with a high degree of flexibility and increased functionality over conventional fuel cell plates.

Another object of the invention is to provide a fuel cell plate that provides for fluid flow from a fluid manifold to a flow channel in the fuel cell plate while retaining the greatest possible structural integrity of the fuel cell plate.

A further object of the invention is to provide a an inexpensive seal that avoids the corrosion problems inherent with drilled holes in the fuel cell plates.

Another object of the invention is to form a fluid flow passage in a fuel cell plate by means other than drilling, thereby surmounting the manufacturing difficulties and expense of a drilled passage.

A further object of the present invention is to provide an effective means for connecting a fluid manifold to a plurality of open-face flow channels on a fluid flow plate.

Another object of the present invention is to provide a method for manufacturing a fuel cell fluid flow plate with an improved passage from the fluid manifold to the flow channels of the plate.

The present invention, as broadly described herein, provides a fluid flow plate assembly comprising a fluid flow plate forming at least one flow channel and forming a hole whose perimeter constitutes a section of a fluid manifold. The fluid flow plate assembly further comprises means for forming a sealed passage from the fluid manifold to the at least one flow channel, which, in a preferred embodiment, comprises an insertable bridgepiece comprising a substantially planar member having a top surface and a side surface. In this embodiment, when the bridgepiece is inserted onto the at least one flow channel, the top surface forms a substantially flush surface with the lands bounding the flow channel, and the side surface forms a section of the fluid manifold.

The present invention, as broadly described herein, also provides an insertable bridgepiece for use with a fluid flow plate adapted for receiving the bridgepiece, wherein the fluid flow plate comprises a major surface forming at least one flow channel bounded by lands, and forms a hole whose perimeter constitutes a section of a fluid manifold and which communicates with the flow channel. In this embodiment, the bridgepiece comprises a substantially planar member having a top surface and a side surface. When the bridgepiece is inserted onto the flow channel, the top surface forms a substantially flush surface with the lands bounding the flow channel, and the side surface forms a section of the fluid manifold.

In one preferred embodiment, the bridgepiece may be supported by at least one vertical member extending from the bottom of the top surface of the bridgepiece to the bottom of the flow channel. In another preferred embodiment the bridgepiece is supported by fluid flow plate channel boundary lands of reduced height.

The insertable bridgepiece of a preferred embodiment of this invention may comprise means for fixing the position of the bridgepiece in the flow channel. For example, the shape of the flow channel in the plane of the major surface of the plate may be formed to substantially conform to the shape of the insertable bridgepiece in the plane of the top surface of the bridgepiece.

In one embodiment of this invention, the insertable bridgepiece comprises an orifice for precise regulation of fluid flow. Such an orifice could be used for bridgepieces inserted onto humidification plates and other plates for which precise regulation of fluid flow is desirable.

The present invention, as broadly described herein, also provides a fuel cell fluid flow plate comprising a major surface that forms an open-face flow channel bounded by lands where the channel is in communication with a manifold hole that constitutes a section of a fluid manifold. In this embodiment, the fuel cell fluid flow plate further comprises means for receiving an insertable bridgepiece near the junction of the manifold hole and the open-face flow channel.

The present invention, as broadly described, also includes a method for manufacturing a fuel cell plate with an insertable fluid flow passage bridgepiece, comprising the steps of manufacturing a substantially planar bridgepiece member, manufacturing a fluid flow plate comprising a fluid manifold hole that communicates directly with an open-face fluid flow channel bounded by lands, and inserting the substantially planar bridgepiece member into the flow channel such that a side surface of the bridgepiece forms a portion of the fluid flow manifold, and its top surface is substantially flush with the lands bounding the open-face fluid flow channel.

Additional objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

FIG. 8 is an exploded perspective view of a fuel cell stack of the present invention.

DETAILED DESCRIPTION OF THE PREFERRED EMBODIMENTS

Figure 1:
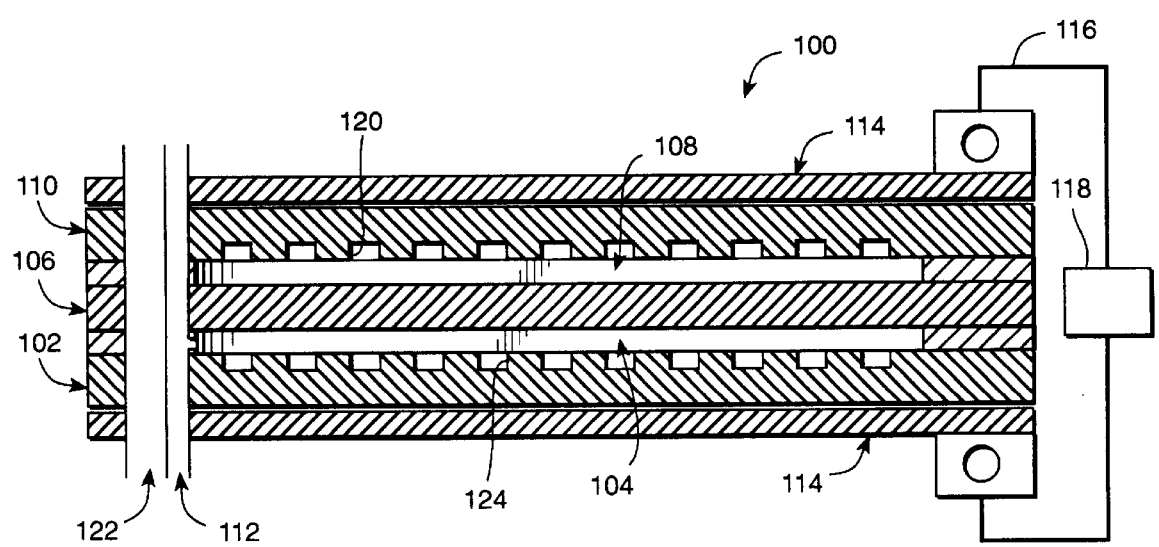
FIG. 1 depicts a PEM fuel cell, for which the insertable bridgepiece of this invention can be used.
Figure 2:
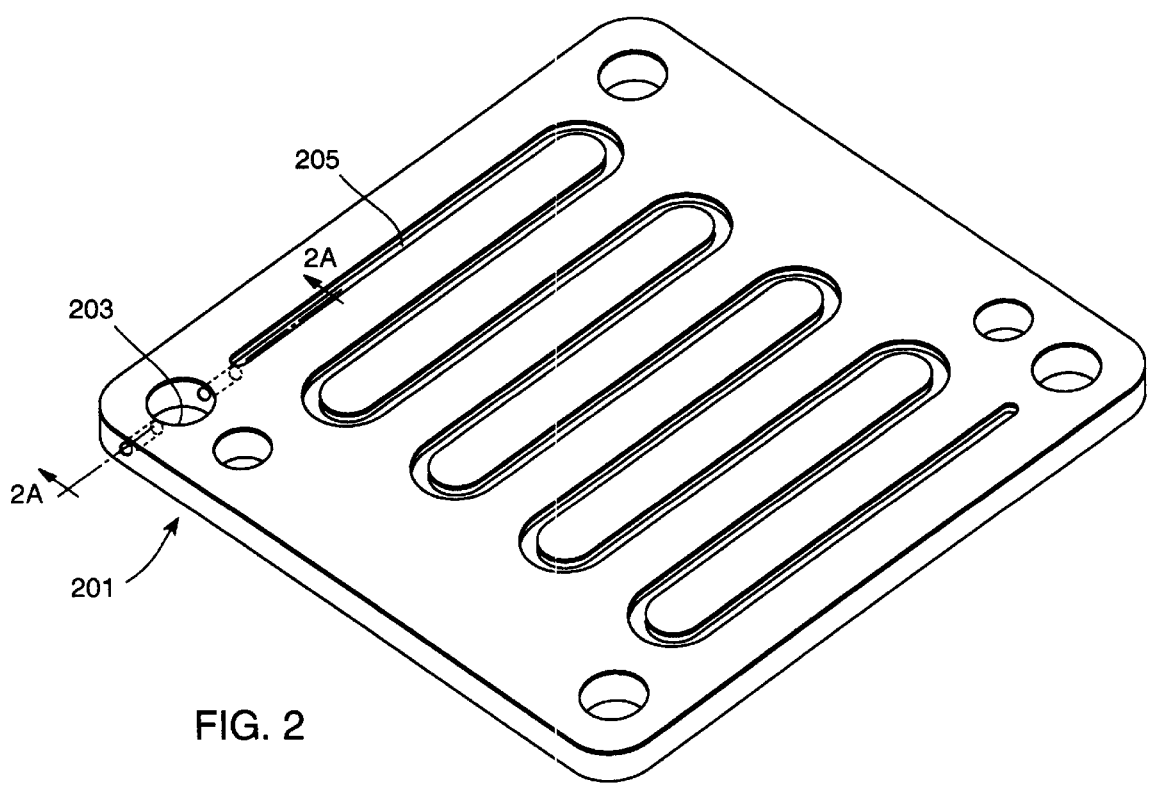
FIGS. 2 and 2A shows a prior art method of drilling a passage in a fluid flow plate to connect an inlet manifold to a fluid flow channel by means of edge drilling.
Figure 2A:
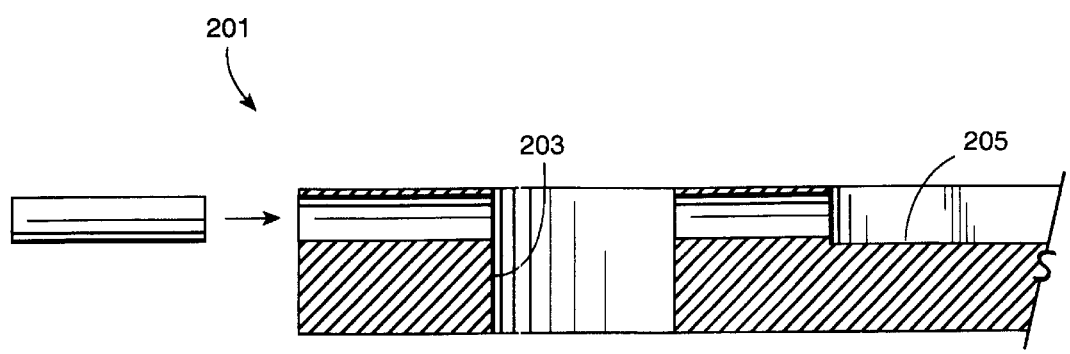
Figure 3:
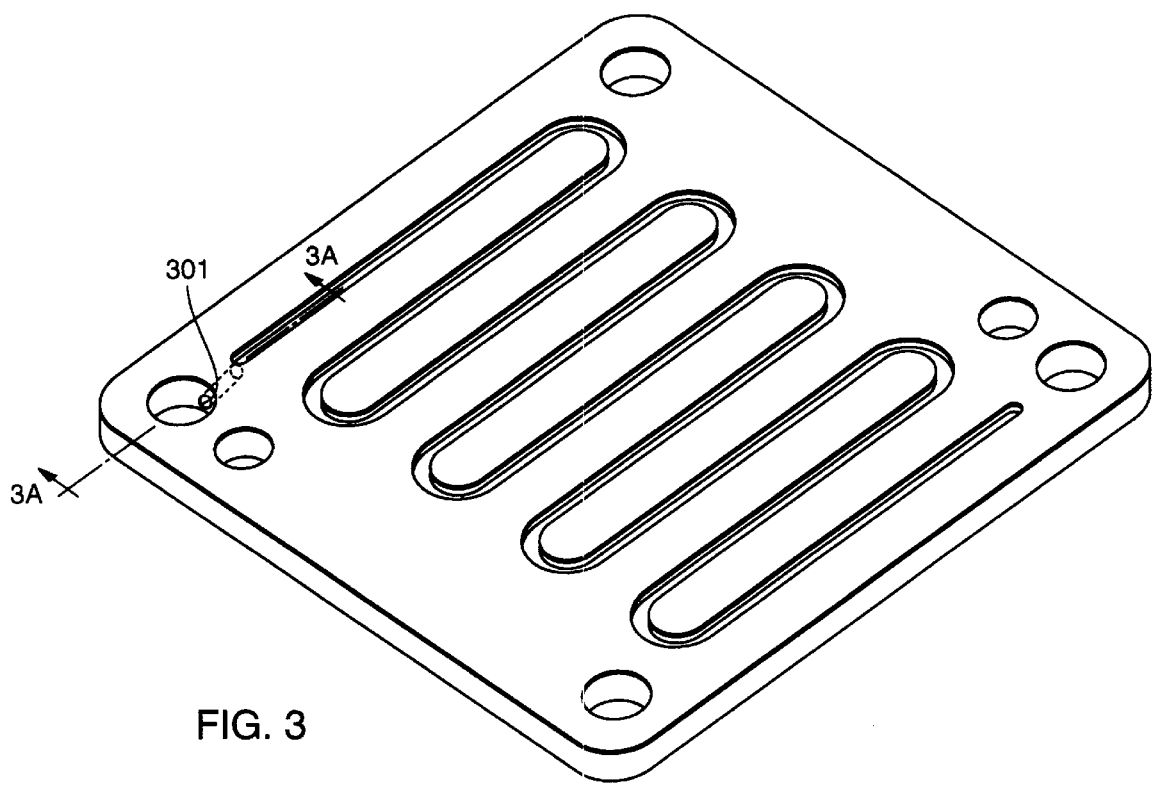
FIGS. 3 and 3A show the prior art method of drilling a passage in a fluid flow plate to connect an inlet manifold to a fluid flow channel by means of angle drilling.
Figure 3A:
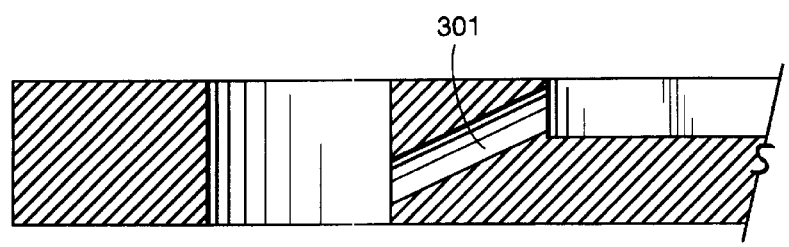

Reference will now be made in detail to the present preferred embodiment of the invention, examples of which are illustrated in the accompanying drawings, wherein like reference numerals indicate like elements throughout the several views.

Figure 4:
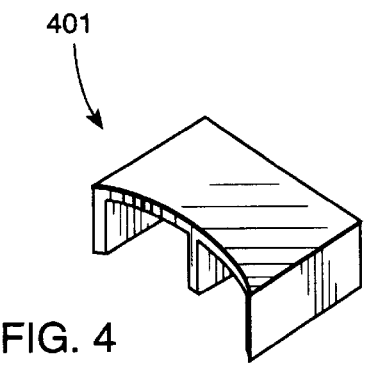
FIG. 4 is a perspective view of a bridgepiece of a preferred embodiment of the present invention.

FIG. 4 depicts a preferred embodiment of a bridgepiece 401 for insertion into a fluid flow plate. The top of the bridgepiece is substantially planar in order to provide support for the stack component that rests on top of the bridge—either a gasket, or an inoperative extension of the proton exchange membrane. The front of the bridgepiece is substantially curved, to conform to the curvature of the fluid inlet manifold of which the front of the bridgepiece will form a part. If a non-circular manifold hole is used, the front of the bridgepiece should have a matching shape (e.g. straight). As depicted in FIG. 4, the bridgepiece may have multiple legs to support it within the channel, and to prevent deformation over time.

The bridgepiece may be made of metal, including for example stainless steel or titanium, or any of various plastics, preferably PVDF or Nylon. Whether metal or plastic, the bridgepiece can readily be formed using various methods known to persons skilled in the art, such as casting, molding, milling or electro-discharge machining (EDM).

Figure 5:
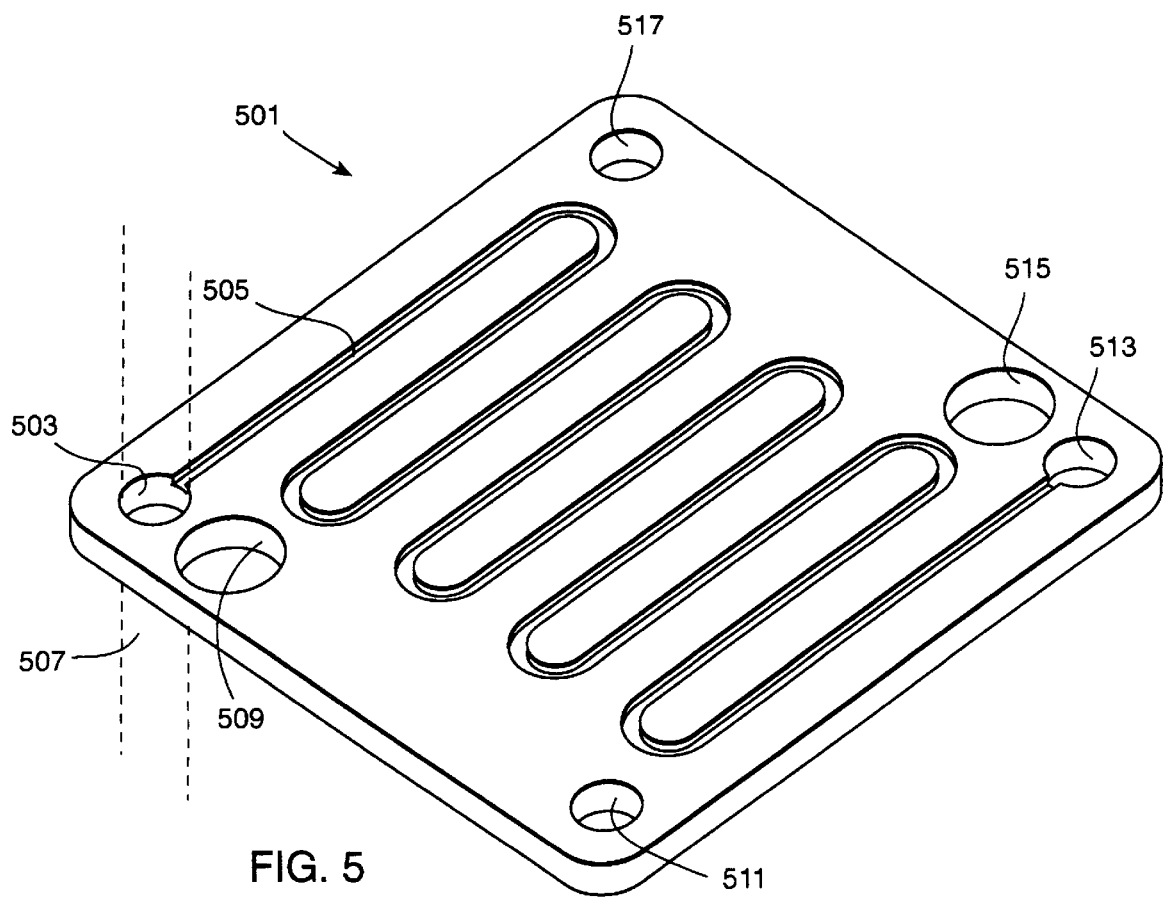
FIG. 5 is a perspective view of the anode side of a bipolar fuel cell plate.

FIG. 5 depicts an anode fluid flow plate 501 of the present invention. The significant difference between this plate and a prior art anode plate is that the fluid flow channel 505 extends all the way to the hydrogen manifold holes 503 and 513. In the case of the anode plate depicted, the flow channel receives hydrogen from hydrogen manifold 507, of which manifold hole 503 forms a part. As depicted in FIG. 5, manifold hole 509 forms a portion of an oxygen inlet manifold, manifold hole 511 forms a portion of a coolant inlet manifold, and manifold holes 513, 515 and 517 form portions of outlet manifolds for exhaust gases and water, respectively.

Figure 6:
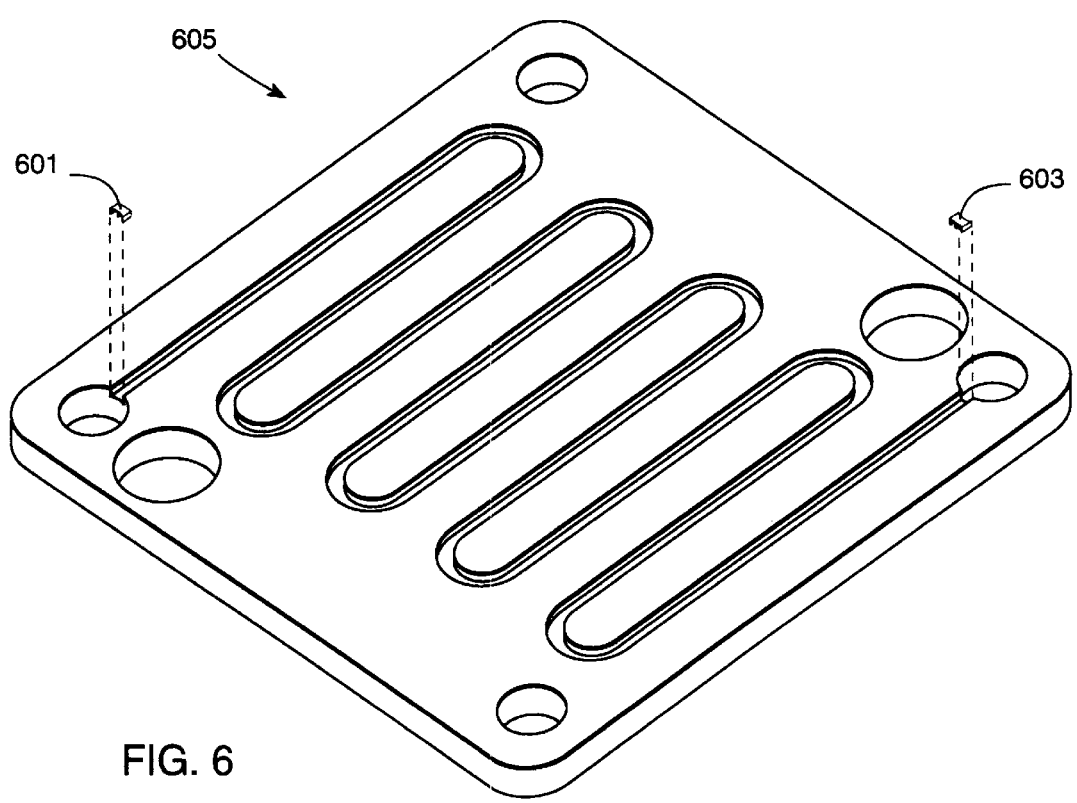
FIG. 6 is a perspective view of the anode side of a bipolar fuel cell plate of the present invention, showing the insertion of the bridgepiece of the present invention into the flow channel.
Figure 9A:
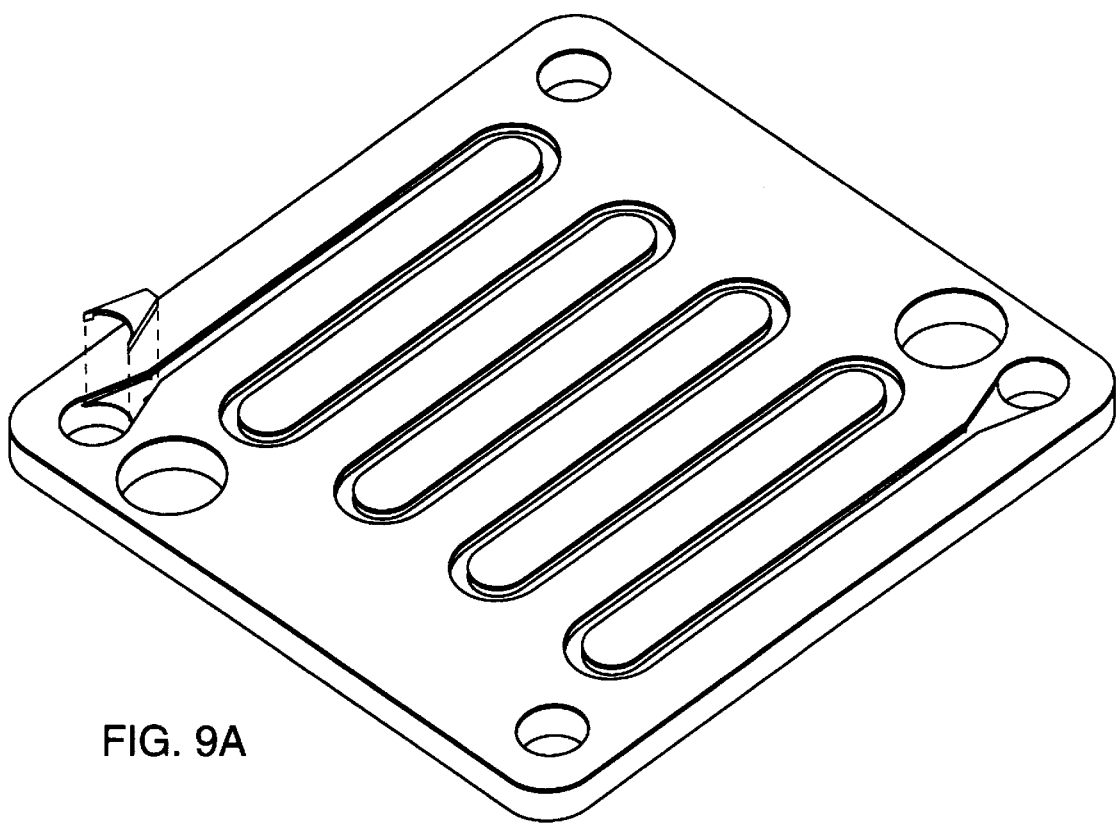
FIGS. 9A–9C are depictions of various embodiments of the bridgepiece and flow plate of the present invention, showing ways in which the geometry of the bridgepiece and flow channel can cause enhanced seating of the bridgepiece.
Figure 9B:
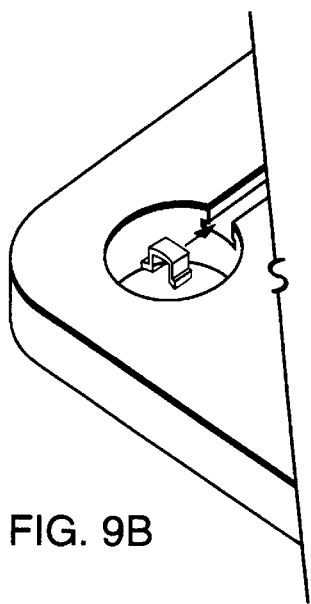
Figure 9C:
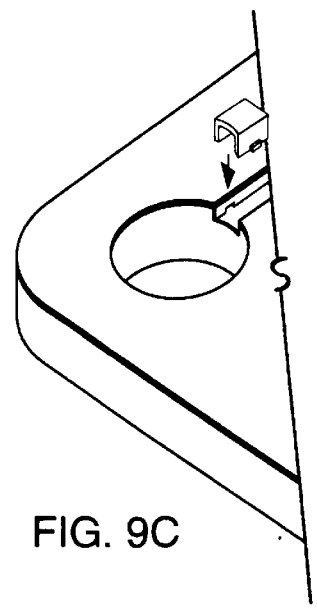

FIG. 6 depicts the insertion of the bridgepieces 601 and 603 into the anode fluid flow plate 605. As can be seen, the curvature of a side of a bridgepiece of the present invention allows it to form an integral part of the hydrogen manifold. The bridgepiece may be epoxied or tackwelded in place, or may rely on the stacking pressure of the other plates to keep it in place. In other preferred embodiments of the invention, as shown in FIGS. 9A–9C below, the bridgepiece and channel are formed with detents and indentations or with unique geometries, such that the bridgepiece will seat within the channel without the need for epoxy or tackwelding.

Figure 7A:
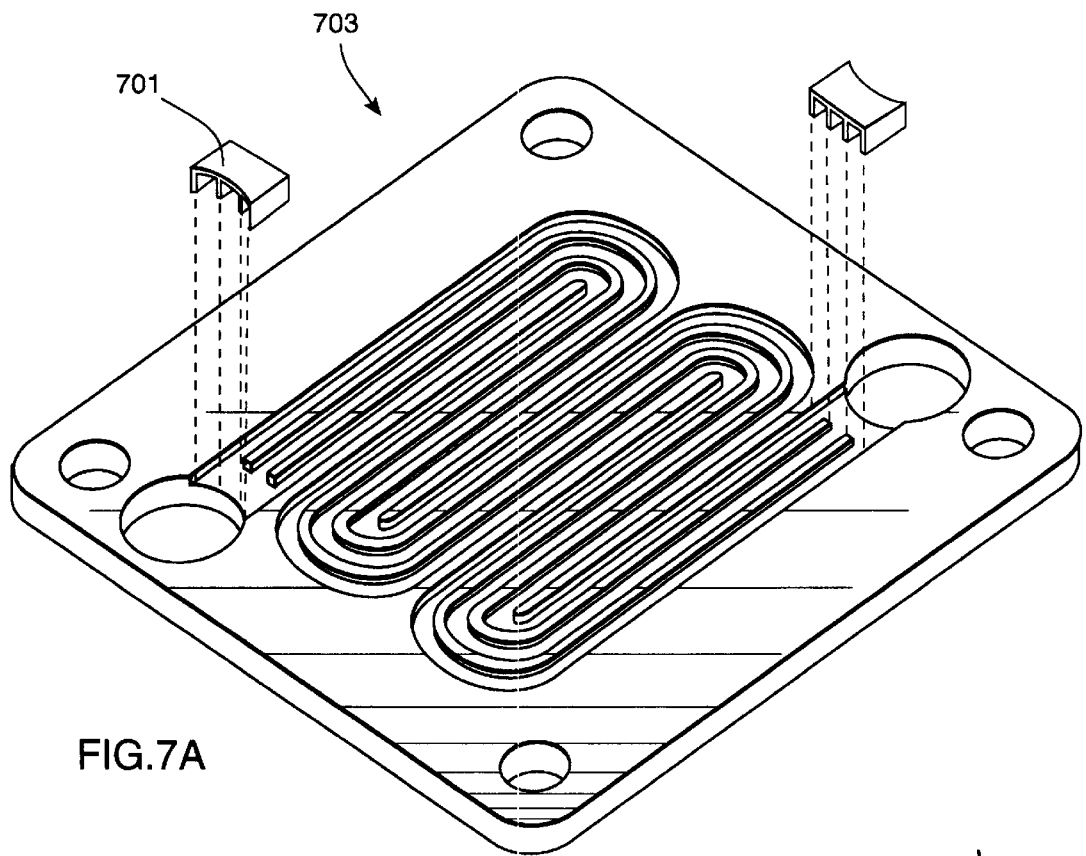
FIG. 7A is a perspective view of the cathode side of a bipolar fuel cell plate having multiple parallel flow channels, showing the insertion of multi-channel bridgepieces of the present invention into the flow channels.

FIG. 7A depicts a preferred embodiment of the insertion of bridgepiece 701 onto a fluid flow plate 703 that forms multiple fluid flow channels.

Figure 7B:
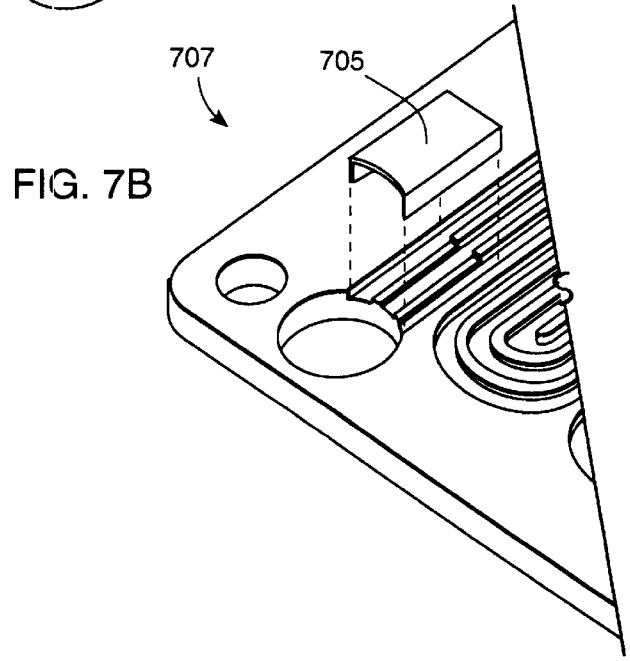
FIG. 7B is a perspective view of a multichannel bridgepiece, utilizing channel ribs for central support.
Figure 7C:
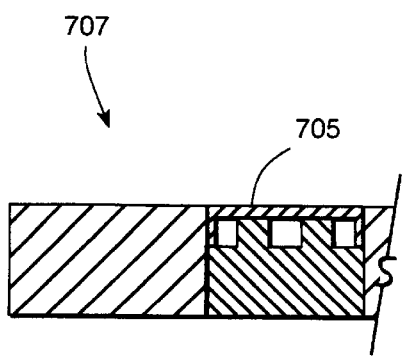
FIG. 7C is a cross-sectional view of a multichannel bridgepiece, utilizing channel ribs for central support.

FIGS. 7B and 7C depict an alternate preferred embodiment of insertion of bridgepiece 705 onto fluid flow plate 707 that forms multiple flow channels. In the embodiment depicted in FIG. 7B, the bridgepiece spans multiple channels, and is supported by channel ribs of reduced height.

FIG. 8 is an exploded view of a preferred embodiment of a cross section of a fuel cell of the present invention, depicting the interaction of the different components of the fuel cell. In the preferred embodiment depicted in FIG. 8, fuel cell plate 803 is a bipolar plate with a hydrogen flow surface on the side facing up (the anode side), and an oxygen flow surface on the side facing down (the cathode side). Adjacent fluid flow plate 809 is also a bipolar plate with the oxygen flow surface (cathode side) facing down. Proton exchange membrane 811 is positioned between the two bipolar plates, and on either side of the proton exchange membrane 811 is a gas diffusion layer (not depicted), which facilitates distribution of reactant gas to reaction sites. Elastomeric "picture frame" gaskets 805 and 808 are positioned between the plates in order to isolate the reactant gases from each other. As depicted in FIG. 8, each fuel cell plate and gasket has holes that align to form the columnar passages that constitute each of the inlet and outlet fluid flow manifolds. In the preferred embodiment depicted in FIG. 8, manifold holes 815 align to form the hydrogen inlet manifold; manifold holes 817 align to form the oxygen inlet manifold; manifold holes 819 align to form the coolant inlet manifold; manifold holes 821 align to form the humidification water inlet manifold; and manifold holes 823, 825 and 827 align to form the hydrogen, oxygen, and water exhaust manifolds, respectively.

For illustration, FIG. 8 shows the placement of two different bridgepieces (801 and 807), but it will be recognized that additional bridgepieces could be usefully deployed.

Bridgepiece 807 is positioned in the oxygen inlet of fuel cell plate 809 and supports gasket 808. Bridgepiece 801 is positioned in the hydrogen inlet of bipolar plate 803 and supports gasket 805. It is readily apparent that without bridgepiece 801 supporting gasket 805, the gasket could droop, allowing flow of $H_2$ gas over the gasket material. Such leakage could result in (1) leakage of $H_2$ to the environment, with loss of power output, as well as potentially explosive side-effects, or (2) an unintentional internal reaction with oxygen from the cathode side of the proton exchange membrane. This mixing could result in loss of power output, and also has the potential to cause localized fuel combustion that can be detrimental to the fuel cell itself.

In addition to the potential for leakage, the drooping gasket could occlude the flow channel, and in that manner reduce the efficiency of the cell.

It has been found that the potential for leakage and mixing of reactant gases is the most serious concern where the fluid is hydrogen or oxygen, whereas the potential for occlusion of the passage is the most serious concern where the fluid is humidification water. Due to the higher mass flow rate of coolant water, occlusion of the coolant flow passage by gasket material is less likely to occur; nevertheless, use of an insertable bridge to provide a passage for coolant flow minimizes any risk of such occlusion.

FIGS. 9A–9C show bridgepieces and fluid flow plates of alternative preferred embodiments of the present invention. These diagrams depict how different geometries of the bridgepiece and fluid flow plate can be used to enable the bridgepiece to stay in place on the fluid flow plate without the need for epoxy or tackwelding. In the embodiment depicted in FIG. 9A, for example, the fluid flow channel widens prior to the intersection of the fluid flow channel and the fluid inlet manifold. The bridgepiece is correspondingly triangular in shape. The widening of the channel thus provides a geometry into which the bridgepiece can easily fit and provides better seating for the bridgepiece. In the embodiment depicted in FIG. 9B, the vertical members of the bridgepiece include horizontal extensions that fit into a correspondingly widened area at the base of the flow channel. In FIG. 9C, the vertical members of the bridgepiece include detents that fit into corresponding indentations at the base of the flow channel.

Figure 10:
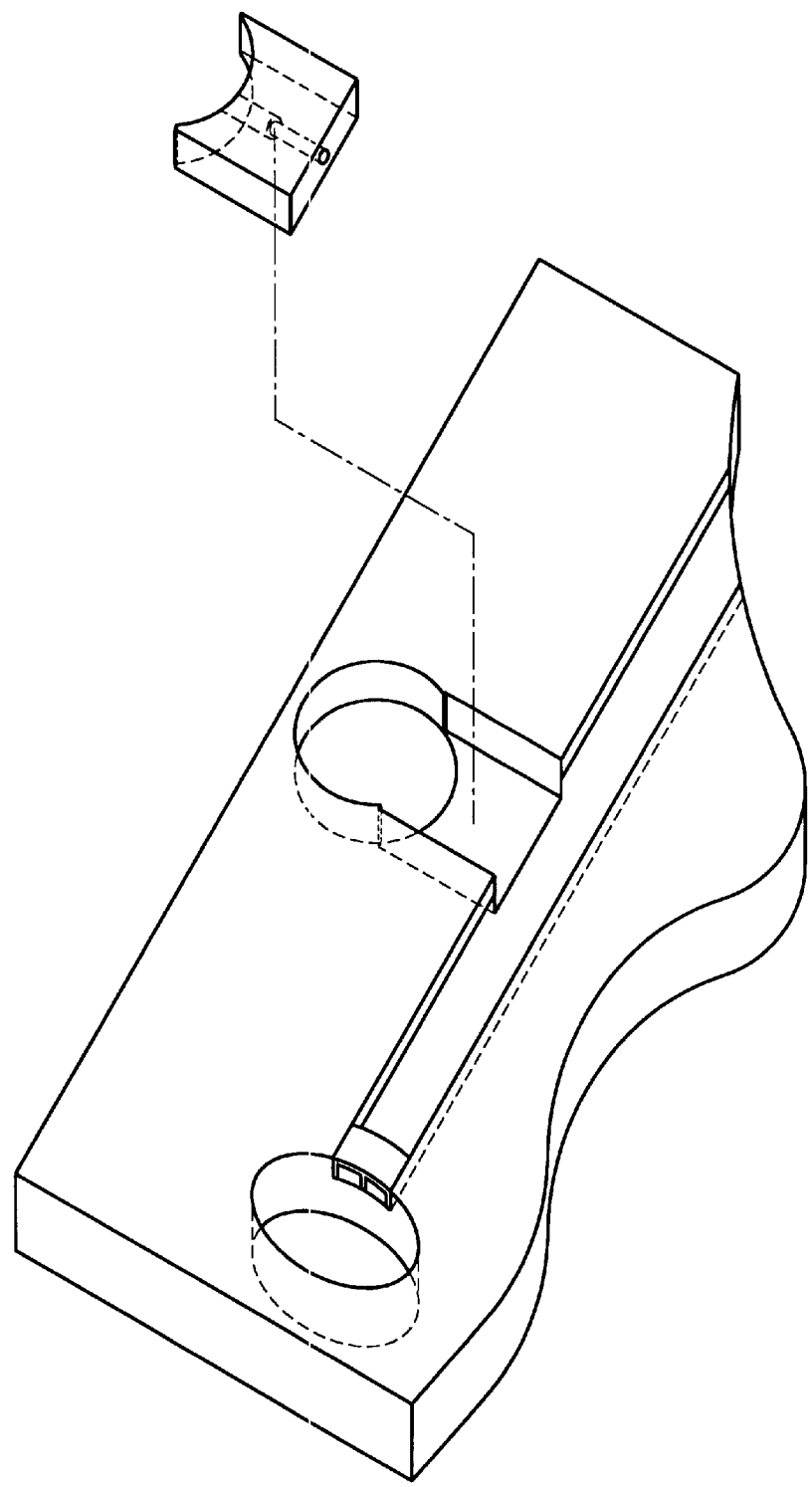
FIG. 10 depicts a bridgepiece with an orifice.

FIG. 10 depicts a bridgepiece having an orifice for precise regulation of humidification fluid flow in a flow channel of a fluid flow plate.

It will be apparent to those skilled in the art that various modifications can be made to this invention of an insertable fluid flow plate bridgepiece and method without departing from the scope or spirit of the invention. It is also intended that the present invention cover modifications, variations and equivalents of the insertable fluid flow plate bridgepiece and method within the scope of the appended claims and their equivalents.

I claim:

1. A fluid flow plate assembly for a fuel cell comprising:
    a fluid flow plate having at least one open-face flow channel bounded by lands, and a manifold hole whose perimeter constitutes a section of a fluid manifold of the fuel cell, said at least one open-face flow channel intersecting said manifold hole; and
    means for forming a sealed passage extending from the manifold hole along the at least one flow channel, wherein the means for forming a sealed passage comprises an insertable bridgepiece comprising a substantially planar member having a top surface and a side surface; and
    wherein when the bridgepiece is inserted onto the at least one flow channel, the top surface forms a substantially flush surface with the lands bounding the flow channel, and the side surface forms a section of the fluid manifold.

2. An insertable bridgepiece in combination with a fuel cell fluid flow plate adapted for receiving the bridgepiece,
    wherein the fluid flow plate comprises a major surface having at least one openface flow channel bounded by lands, and a manifold hole whose perimeter constitutes a section of a fluid manifold of the fuel cell;
    wherein the manifold hole communicates directly with the at least one flow channel;
    wherein the bridgepiece comprises a substantially planar member having a top surface and a side surface; and
    wherein the bridgepiece is configured to be inserted onto the flow channel adjacent the manifold hole such that the top surface forms a substantially flush surface with the lands bounding the at least one flow channel, and the side surface flows a section of the fluid manifold.

3. The fluid flow plate assembly of claim 1, wherein the insertable bridgepiece further comprises:
    at least one vertical member substantially orthogonal to the substantially planar member,
    wherein the at least one vertical member extends from the bottom of the top surface of the bridgpiece to the bottom of the flow channel.

4. The fluid flow plate assembly of claim 1, wherein the insertable bridgepiece is supported by fluid flow plate channel boundary ribs of reduced height.

5. The fluid flow plate assembly of claim 1, further comprising means for fixing the bridgepiece in the flow channel.

6. The fluid flow plate assembly of claim 1, wherein the shape of the insertable bridgepiece in the plane of the top surface of the bridgepiece substantially conforms to the shape of the at least one flow channel near the manifold hole.

7. The fluid flow plate assembly of claim 1, wherein the fluid manifold comprises a hydrogen inlet manifold.

8. The fluid flow plate assembly of claims 1, wherein the fluid manifold comprises an oxygen inlet manifold.

9. The fluid flow plate assembly of claim 1, wherein the fluid manifold comprises a humidification water inlet manifold.

10. The fluid flow plate assembly of claim 1, wherein the fluid manifold comprises a coolant inlet manifold.

11. The fluid flow plate assenbly of claim 1, wherein the fluid manifold comprising a hydrogen outlet manifold.

12. The fluid flow plate assembly of claim 1, wherein the fluid manifold comprises an oxygen outlet manifold.

13. The fluid flow plate assembly of claim 1, wherein the fluid manifold comprises a humidification water outlet manifold.

14. The fluid flow plate assembly of claim 1, wherein the fluid manifold comprises a coolant outlet manifold.

15. The fluid flow plate assembly of claim 1, wherein the bridgepiece further comprises an orifice for precise regulation of fluid flow.

16. A fluid flow plate comprising:
    a major surface forming an open-face flow channel bounded by lands, and forming a manifold hole that constitutes a section of a fluid manifold, wherein the manifold hole communicates with the flow channel; and
    means for receiving an insertable bridgepiece near the junction of the manifold hole and the open-face flow channel,
    said bridgepiece comprising a substantially planar member having a top surface and a side surface, wherein when the bridgepiece is inserted onto the flow channel, the top surface forms a substantially flush surface with the lands bounding the at least one flow channel, and the side surface forms a section of the fluid manifold.

17. The fluid flow plate of claim 16, further comprising channel boundary lands of reduced height at the junction of the manifold hole and the fluid flow channel, wherein the channel boundary lands of reduced height support the bridgepiece.

18. A method for forming a fuel cell fluid flow plate assembly, comprising:

provide a fluid flow plate having a fluid manifold hole and at least one open-face fluid flow channel bounded by lands, wherein the fluid manifold hole has an intersection with and communicates directly with the at least one open-face fluid flow channel;

providing a bridgepiece having a top surface and a side surface; and inserting the bridgepiece into the at least one fluid flow channel such that its side surface forms a portion of the fluid manifold, and its top surface is substantially flush with the lands bounding the at least one open-face fluid flow channel.

19. The method of claim 18, wherein providing the fluid flow plate further comprises:

providing the fluid flow channel for the fluid flow plate with channel boundary ribs of reduced height near the intersection of the fluid manifold and the fluid flow channel, wherein the channel boundary ribs of reduced height support the bridgepiece.

* * * * *

UNITED STATES PATENT AND TRADEMARK OFFICE
CERTIFICATE OF CORRECTION

PATENT NO. : 6,017,648
DATED : January 25, 2000
INVENTOR(S) : Daniel O. Jones

It is certified that error appears in the above-identified patent and that said Letters Patent is hereby corrected as shown below:

IN THE CLAIMS:

Claim 2, Col. 8, line 7, delete "flows" and replace with --forms--.

Claim 16, Col. 8, line 47, after "plate" insert --of a fuel cell--.

Claim 16, Col. 8, line 50, delete "forming" and replace with --having--.

Claim 16, Col. 8, line 51, after "manifold" insert --of the fuel cell--.

Claim 16, Col. 8, line 52, after "hole" insert --has an intersection with and--.

Claim 16, Col. 8, line 55, delete "junction" and replace with --intersection--.

Claim 17, Col. 8, line 63, delete "comprising" and replace with --comprising:--.

Claim 17, Col. 8, line 64, delete "lands of reduced height at the junction" and replace with --ribs of reduced height near the intersection--.

Claim 17, Col. 8, line 66, delete "lands" and replace with --ribs--.

Signed and Sealed this

Fifth Day of December, 2000

Attest:

Attesting Officer

Q. TODD DICKINSON
Director of Patents and Trademarks